United States Patent [19]

Mathews

[11] 4,342,514
[45] Aug. 3, 1982

[54] MEANS AND METHOD FOR TESTING LASER RANGE FINDERS

[75] Inventor: Paul B. Mathews, Seattle, Wash.

[73] Assignee: The United States of America as represented by the Secretary of the Army, Washington, D.C.

[21] Appl. No.: 177,032

[22] Filed: Aug. 11, 1980

[51] Int. Cl.³ .............................................. G01C 3/08
[52] U.S. Cl. ........................................... 356/5; 434/4
[58] Field of Search .................. 434/2, 4, 6; 343/17.7; 356/5

[56] References Cited

U.S. PATENT DOCUMENTS 2,855,509 10/1958 Moore ................................. 343/17.7
3,018,478 1/1962 Skillman et al. .................... 343/17.7

Primary Examiner—S. C. Buczinski
Attorney, Agent, or Firm—Nathan Edelberg; Robert P. Gibson; Max Yarmovsky

[57] ABSTRACT

Apparatus and method for using one laser range finder to calibrate another similar range finder. The range finder under test receives a simulated return pulse from the transmitter of the second range finder. An external trigger initiates the transmitter of the range finder under test and a short time later initiates the transmitter of the second range finder. The transmitted beam of the second range finder is directed into the receiver of the range finder under test and it halts the range readout thereof. This range readout is compared to the reading on an external timer arranged to measure the time interval between the emission of the transmitted beams of the two range finders.

4 Claims, 2 Drawing Figures

4,342,514

MEANS AND METHOD FOR TESTING LASER RANGE FINDERS

GOVERNMENTAL INTEREST

The invention described herein was made in the course of a contract with the Government and may be manufactured, used and licensed by or for the Government for governmental purposes without the payment to me of any royalty thereon.

BACKGROUND OF THE INVENTION

In the past the range accuracy and receiver sensitivity of laser range finders has been measured by methods such as aiming the device at a plurality of targets at different ranges set up on a test range. Such a testing method requires much space, is subject to errors caused by differing atmospheric conditions, and requires an accurate measurement of the range of the different targets, which can be time consuming. Another method which has been used is to apply the laser pulse output of the device being tested to a coiled length of optical fiber and to feed the output of the optical fiber to the device's receiver. The range reading obtained from such a device will be considerably more than that from a target at half the distance of the optical fiber's length, since the speed of propagation of the laser beam in the fiber is less than that "in vacuuo" by a factor equal to the index of refraction of the fiber. Thus an accurate knowledge of the index of refraction of the fiber is necessary if this method is to be accurate, and this is not always known with the required accuracy.

The present invention overcomes many of the disadvantages of these prior art testing and calibration techniques by utilizing one range finder as a testing device for another range finder, and interconnecting the two devices with certain readily available electronic measuring devices to obtain accurate range and sensitivity calibration in the laboratory.

SUMMARY OF THE INVENTION

In accordance with the present invention, the range finder under test receives a simulated return pulse provided by a suitably attenuated transmitted pulse from a second adjacent range finder unit. Targets at different ranges can be simulated by triggering the two range finders sequentially, with different time delays between the triggering pulses, to provide different simulated ranges. The range accuracy of the device under test is measured by comparing the range reading on the device with the reading of an external timer which measures the time between the start of the transmitted pulse of the device under test and the start of the simulated return pulse emitted by the transmitter of the second range finder.

A neutral density filter can be used to attenuate the transmitted pulse of the second range finder which provides the return pulse simulating a distant target. By progressively increasing the opacity of this filter, the sensitivity of the range finder under test can be measured, or a single filter of this type can be chosen for all tests so that a "go, no go" sensitivity test results. The opacity of such a single filter would be chosen so that the resulting simulated return pulse applied to the device under test would be attenuated to such a degree that it would be just strong enough to operate a receiver with a sensitivity at the low end of the rated receiver sensitivity. Thus any receivers with sensitivity lower than this would not respond to the simulated return pulse and would not shown accurate readings compared to the aforementioned external timer.

If it is not necessary or desirable to test receiver sensitivity in this way, attenuation of the second range finder's output can be accomplished by reducing the voltage applied to the flash tube therein.

Further details of the circuitry involved in this novel testing method and apparatus will become apparent from the detailed description below.

DETAILED DESCRIPTION OF A PREFERRED EMBODIMENT

Figure 1:
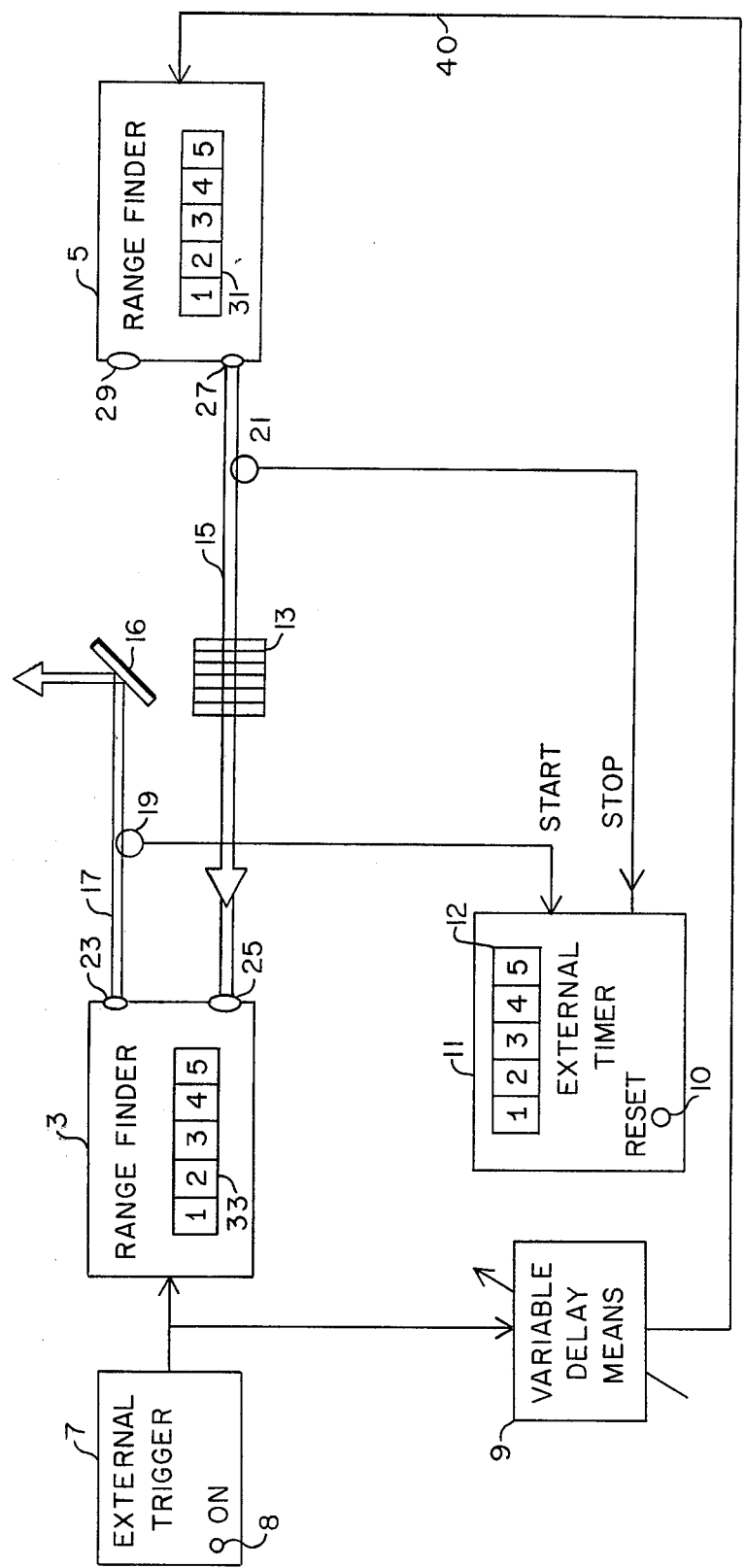
FIG. 1 is a block diagram of the circuitry required to carry out the invention, and also illustrates the steps of the novel testing method.

In FIG. 1 the range finder under test is indicated by reference numeral 3. The second range finder 5 is arranged so that its output or transmitted laser pulse 15 is directed into the receiver of the range finder 3 under test. The lenses 23 and 25 of the range finder under test indicate the transmitter or output and the receiver or input, respectively. Similarly the lens 29 is the receiver or input of the second range finder 5, and the lens 27 indicates the output or transmitter thereof. A neutral density filter 13 attenuates the beam 15 to prevent overloading of the receiver circuitry of device 3 under test. As explained above, the filter 13 can also be used to measure the sensitivity of the device under test.

An external trigger circuit 7 is connected to a trigger input of the range finder 3, and also to variable delay means 9. The output of delay means 9 is applied via lead 40 to a trigger input of the second range finder 5. An external timer 11 is arranged to measure the time interval between the start of the transmitted beam 17 emitted by the range finder under test and the start of the simulated return pulse 15 emitted by the transmitter of the second range finder 5. To this end, a photodetector 19 intercepts a portion of the beam 17 and another similar photodetector 21 intercepts a portion of the beam 15. The photodetector 19 is connected to the "start" input of timer 11 and photodetector 21 to the "stop" input thereof. After the beam 17 has passed the photodetector 19, it is no longer needed and is deflected away by mirror 16.

In order to test the range accuracy of range finder 3, the timer 11 would be reset to zero by reset switch 10 and the readout or display 33 of the device under test also reset. The variable delay means is then set to simulate a target at a desired range. The delay means may be calibrated to introduce variable delays from 1 to 10 microseconds in the triggering pulses applied to the two range finders. A delay of 1 microsecond would simulate a target with a 1 microsecond round trip transit time, or a range of just under 500 feet. A 10 microsecond delay thus would similate a target at just under 5000 foot range. The delay means 9 may be of the analog or digital type, that is it may have a continuously variable analog control, or it may for example have a pair of ten-position switches to digitally vary the delay in tenths of microsecond steps from 0.1 to 10 microseconds.

When the "on" button 8 of external trigger 7 is pressed the range finder 3 will first be triggered, its transmitter 23 will emit a pulse of laser light, 17, which will actuate photodetector 19. The internal circuitry of range finder 3 will, simultaneously with the emission of the pulse 17, start its range readout 33 counting units of range, feet, yards or meters, however the device is calibrated. The simultaneous output from photodetector 19 will start external timer 11. Preferably, timer 11 is calibrated in the same units of length as is the range finder under test. After a delay determined by delay means 9, the second range finder 5 will be triggered, and its transmitter will emit pulse 15, which produces an output from photodetector 21 which is applied to the "stop" input of timer 11. After passing through filter 13, this pulse enters the receiver 25 of the device under test. This simulated return pulse halts the operation of the range readout 33, and if the device is working properly, the reading on readout 33 will be the same as that on external timer 11, assuming that the timer has been calibrated to distance in the same units as that of the range finder readout 33. If external timer 11 is calibrated to readout in time, for example, in microseconds and decimal fractions thereof, it would be necessary to convert the time readout thereof to its equivalent range by means of the formula, Range=$\frac{1}{2}$ vt, where v is the velocity of propagation of the laser beam and t is the reading of timer 11. The calculated range is then compared to the reading on readout 33. A table or monograph could be devised to obtain the range without calculation.

Normally the range accuracy would be checked at several different simulated ranges by repeating the above test with different settings of the variable time delay means 9. When one range finder has been tested in this way, the two range finders can be easily interchanged so that the second range finder 5 becomes the device under test.

Figure 2:
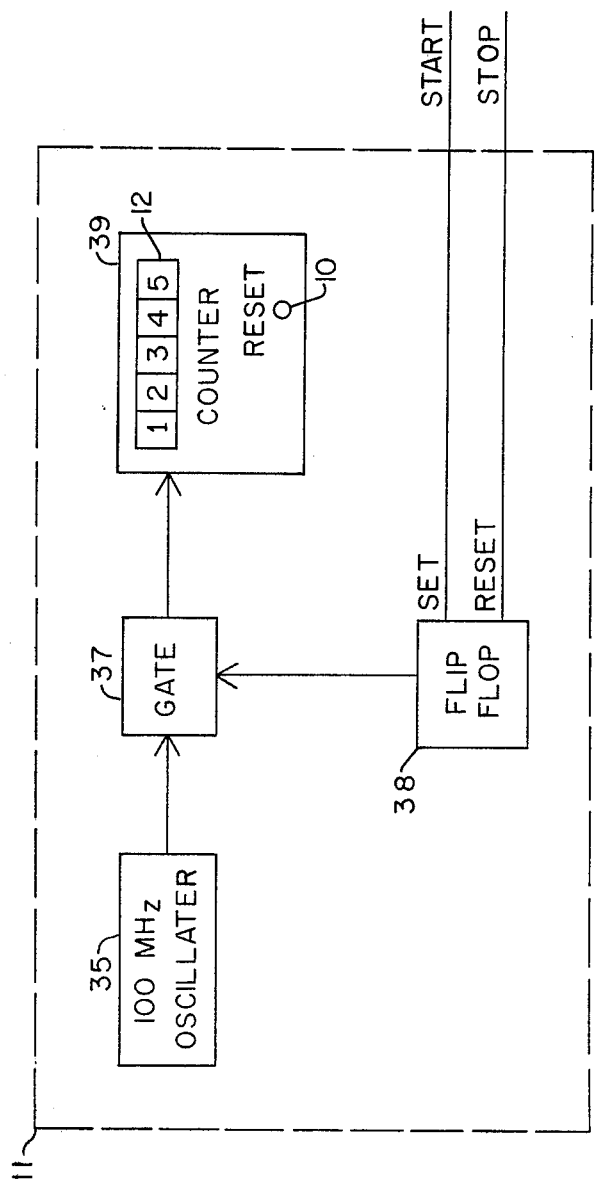
FIG. 2 shows some additional details of the external timer used in FIG. 1.

The external timer 11 may include circuitry such as is shown in FIG. 2. The 100 megahertz oscillator 35 would be running continuously, with its output connected to the input of counter 39 through a transmission-type gate 37. This gate is controlled by the flip-flop 38. When the flip-flop is in one state, the gate will be open and apply the oscillator output to the counter, and in the other state will be closed to block the path from the oscillator to the counter. The start input is applied to the set input of the flip-flop and the "stop" input to the reset input, as shown. The flip-flop output is connected to the gate 37 in such a way that when the flip-flop is set, a bias will be applied to the gate to open it and when the flip-flop is reset, the bias will be removed to close the gate. With a 100 megahertz oscillator, the counter will indicate microseconds and hundreths of microseconds.

The concept of this invention can be utilized for calibrating range finders operating in other parts of the spectrum, for example, microwaves, radar, x-ray and acoustic waves.

While the invention has been described in connection with a preferred embodiment, variations thereof are possible without departing from the spirit of the invention, hence the invention should be limited only by the scope of the appended claims.

I claim:

1. Apparatus for testing laser range finder, comprising:
    a first range finder under test;
    a second range finder operatively positioned in confronting relationship with said first range finder such that a transmitted beam of said second range finder is directed into a receiver of said first range finder;
    means to sequentially trigger said first range finder and said second range finder, in that order, which includes;
        an external trigger having its output electrically connected to a trigger input of said first range finder and to a variable delay means, the output of said variable delay means is connected to a trigger input of said second range finder;
    an external timer having a reset switch and start and stop input terminals;
    a first photodetector electrically connected to said start input and positioned to be illuminated by a transmitted laser pulse of said first range finder; and
    a second photodetector electrically connected to said stop input and positioned to be illuminated by a transmitted beam pulse of said second range finder.

2. The apparatus of claim 1, wherein said transmitted beam from said second range finder is attenuated by means of a neutral density filter to prevent overloading of the receiver of said range finder under test.

3. A method for calibrating laser range finders comprising the steps of:
    positioning a first range finder under test with respect to a second range finder so that a transmitter laser output pulse of said second range finder is optically in alignment with a receiver of said first range finder;
    electrically connecting an external trigger to the trigger input terminal of said first range finder and to a variable delay means;
    electrically coupling the output of said variable delay means to a trigger input of said second range finder;
    positioning a neutral density filter intermediate said first and second range finder to attenuate the transmitter laser output pulse of said second range finder;
    positioning a first photodetector to intercept a portion of a transmitter laser beam of said first range finder;
    electrically coupling the output of said first photodetector to a start terminal of an external timer;
    positioning a second photodetector to intercept a portion of said transmitted laser beam of said second range finder;
    electrically coupling the output of said second photodetector to a stop terinal of said external timer;
    setting a reset switch on said external timer to zero;
    setting a readout display of said first and second range finder to zero;
    adjusting the variable delay means delay time to simulate a target at a desired range;
    positioning a mirror intermediate said first photodetector and said second range finder to intercept and deflect the transmitter laser beam of said first range finder;
    activating said external trigger to trigger said first range finder so that it emits a pulse of laser light which will in turn activate said first photodetector to start said external timer, said external trigger simultaneously triggers said second range finder to emit a simulated return pulse which produces an output from said second photodetector shutting off said external timer and halting the operation of said readout display of said first range finder;

comparing the reading on the readout of said first range finder under test with the reading on said external timer to determine the accuracy of said range finder under test.

4. Apparatus for testing the accuracy and sensitivity of a first laser range finder, comprising, means for directing a transmitted beam of a second range finder into a receiver of said first range finder, an optical filter arranged in the path of said transmitted beam of such opacity that the beam entering said receiver will be just strong enough to operate the circuitry of a receiver having minimum acceptable sensitivity, an external trigger circuit connected to a trigger input of said first range finder and to a variable delay means, the output of said variable delay means connected to a trigger input of said second range finder, whereby said range finders may be sequentially triggered with different time delays between the sequential triggering, and an external timer arranged to be started in response to a transmitted beam of said first range finder and stopped in response to the transmitted beam of said second range finder.

* * * * *